Patented Apr. 12, 1938

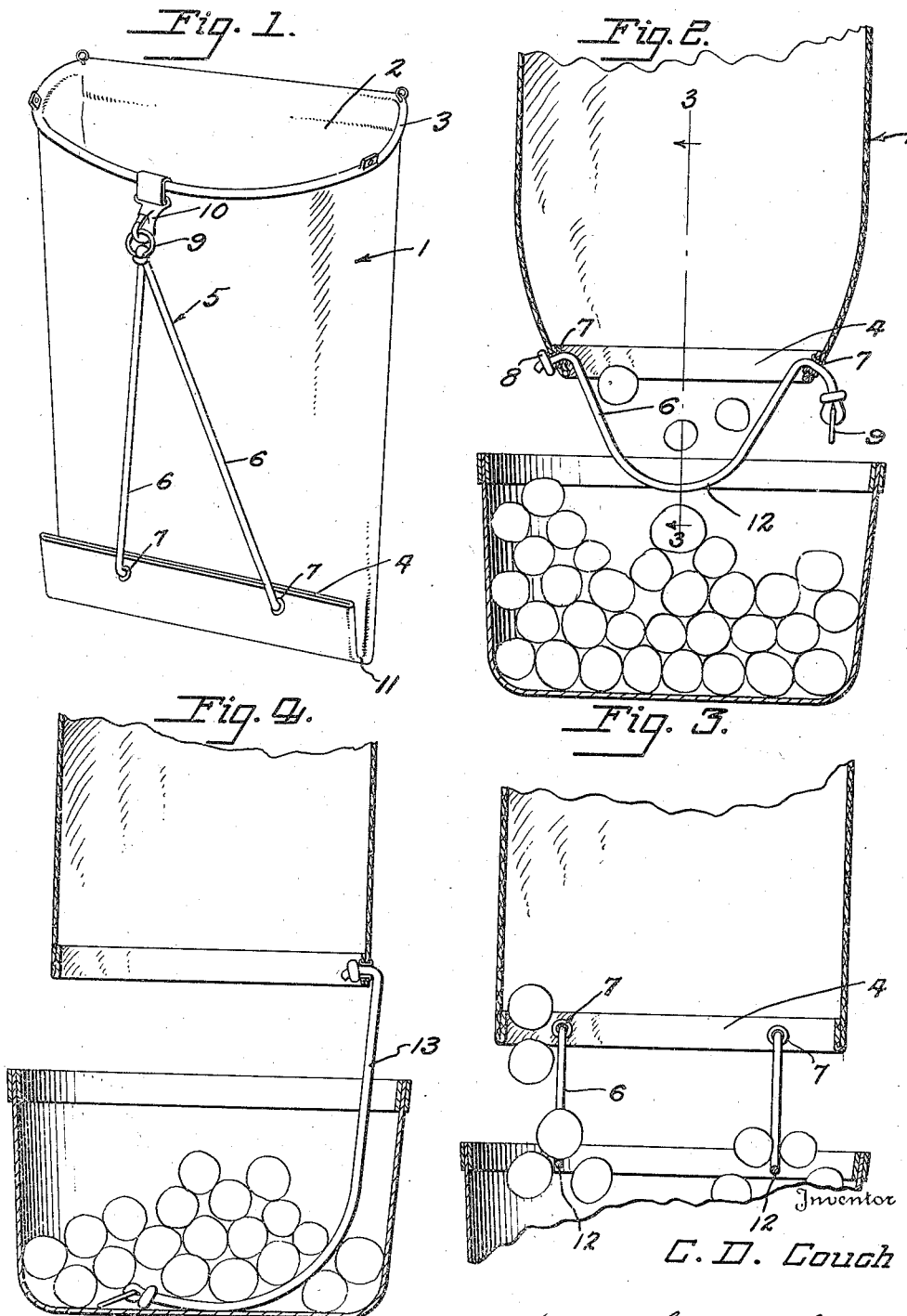

2,113,876

UNITED STATES PATENT OFFICE 2,113,876

FRUIT-PICKING BAG

Claude D. Couch, Sanford, Fla.

Application December 4, 1936, Serial No. 114,271

2 Claims. (Cl. 150—2)

This invention relates to fruit picking bags of that type in which a valve bottomed bag is normally held closed by harness attached at the bottom and being latched at the side of the bag, while the latter is being filled with fruit as it is picked from the tree, and in which when the harness is released, the bottom of the bag automatically opens under the weight of the contained fruit, discharging the contents into an under-placed basket.

Fruit-picking bags of this general type are of great antiquity, but have two inherent faults which it is the purpose of the present invention to correct. They dump the fruit out all at once and so forcibly as to break the skin and otherwise damage the fruit, and the released harness which usually consists of one or more ropes falls first into the basket becoming buried under the fruit, from which it is jerked in freeing the bag, tearing and bruising the fruit skins. These drawbacks become serious considerations in the citrus fruit industry; even slight abrasions of the fruit skin mark the fruit as a victim of blue mold and other agencies of decay.

The present invention has for one of its objects, in a valve bottomed bag, to arrange the harness to automatically control the opening of the bag bottom so as to effect gradual and orderly discharge of the fruit.

Another object of the invention is to provide that the slack of the released harness shall automatically be taken up as the bottom of the bag distends, in the act of opening, thus keeping the harness up out of the basket so that it will not be buried under the discharged fruit.

Other objects of the invention will appear as the following description of a preferred and practical embodiment thereof proceeds.

In the drawing which accompanies and forms a part of the following specification and throughout the several figures of which the same characters of reference have been employed to designate identical parts:

Figure 1 is a perspective view of a fruit-picking bag embracing the features of the present invention;

Figure 2 is a vertical section through the lower part of the bag in distended position showing the relation of the released harness to an under-placed basket;

Figure 3 is a vertical section taken along the line 3—3 of Figure 2, part of the basket being broken away; and Figure 4 is a section similar to that shown in Figure 2, contrasting the old form of harness with that of the new.

Referring now in detail to the several figures the numeral 1 represents the tubular flexible fabric body of the bag, the upper end or mouth 2 of which is maintained permanently distended by a suitable reinforcing rim 3 and the lower end 4 of which is free to open. In Figure 1 the lower end is shown as being closed flat and up-folded while in Figure 2 it is distended into an irregularly cylindrical form.

The bottom of the bag is controlled by harness in general designated by the reference character 5 and consisting in the illustrated embodiment of the invention of a pair of drawcords 6, each of which passes through both sides of the bottom of the bag, bridging the space between said sides when the bottom is extended as shown in Figure 2. The drawcords in the preferred form of the invention pass through grommets 7 in the opposite sides of the bag, the cords being knotted as at 8 or otherwise connected to one side of the bag and passing freely through the grommets on the opposite side so that when the cords are pulled, the sides of the bag are drawn together. As is usual in such bags and as a convenience to the operator, the drawcords come together and are provided with a loop 9 which may be engaged with a hook 10 fixed with respect to the bag at a point remote from the bottom.

The length of the drawcords is such that when the loop 9 is engaged with the hook 10, the opposite sides of the bottom will not only be drawn together, but folded upwardly as at 11 in Figure 1, thus securely closing the bottom, preventing the escape of any of the fruit with which the bag may be filled. The length of the drawcords is also such that when the loop 9 is disengaged from the hook 10 and the bottom distends under the weight of the discharging fruit, the slackness of the drawcords cannot extend more than to form a shallow bight 12 since the loop 9 or the portion of the drawcord adjacent the same will abut the grommet 7 in the distended state of the bag and prevent the drawcord being pulled out any further.

A glance at Fig. 4 will illustrate the old construction in which the drawcords or harness 13 are attached to only one side of the bag and when released form no bight, but fall into the bottom of the basket. The mouth of the bag being uncontrolled, immediately distends to its fullest extent, dumping the entire contents of the fruit into the basket and burying the drawcord 13. Not only is the fruit liable to be bruised and otherwise damaged by so sudden a discharge, but the drawcord must be jerked out from beneath the mass of fruit with the almost certain risk of breaking the fruit skins.

In the improved fruit-picking bag of the present invention, the bights 12 of the drawcord present interference to the falling fruit. The weight of the fruit striking the bights pulls them down somewhat and draws the opposite sides of the bag together narrowing the opening at the bottom and thus controlling the discharge of fruit therefrom, making it a gradual flow instead of a sudden drop. It will be observed that the bights 12 of the drawcords do not fall into the basket and consequently there is no disturbance of the fruit in removing the bag.

While I have in the above description disclosed what I believe to be a preferred and practical embodiment of my invention, it will be understood to those skilled in the art that the specific embodiment as shown is by way of example and not to be construed as limiting the scope of the invention as claimed.

What I claim is:

1. Fruit-picking bag comprising a flexible tubular openable bottomed fabric member, a drawcord bridging the space between opposite sides of the open bottom of said member, connected to one side and passing freely through the other, a loop on said cord and a cooperating hook on said bag remote from the bottom, the length of said cord between its point of connection with said tubular member, and said loop being such as to hold the bottom of said bag closed and up-folded when said loop is on said hook, and to limit the slack of said cord between the sides of the bottom of said bag to a shallow bight when the cord is unhooked and the bottom of the bag distended offering interference to the free egress of the fruit, and said bight, weighted by contact of the fruit, drawing the opposite sides of the bottom of said bag toward one another retarding the discharge of the fruit.

2. Fruit-picking bag comprising a flexible tubular openable bottomed fabric member, harness comprising a plurality of drawcords bridging the space between the opposite sides of the open bottom of said member, connected to one side and passing freely through the other, a loop common to said drawcords, and a cooperating hook on said bag remote from said bottom, the length of said harness between the points of connection of said cords with said tubular member, and said loop, being such as to hold the bottom of said bag closed and up-folded when said loop is on said hook, and to limit the slack of said cords between the sides of the bottom of said bag to shallow bights, when the harness is unhooked and the bottom of the bag distended, offering interference to the free egress of the fruit, said bights, weighted by contact of the fruit drawing the opposite sides of the bottom of said bag toward one another retarding the discharge of the fruit.

CLAUDE D. COUCH.